(12) United States Patent
Bolle et al.

(10) Patent No.: US 8,249,314 B2
(45) Date of Patent: Aug. 21, 2012

(54) ANONYMOUS AND REVOCABLE FINGERPRINT RECOGNITION

(75) Inventors: Rudolf M. Bolle, Bedford Hills, NY (US); Jonathan H. Connell, Cortlandt Manor, NY (US); Tsai-Yang Jea, Poughkeepsie, NY (US); Nalini K. Ratha, Yorktown Hts, NY (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 12/187,705

(22) Filed: Aug. 7, 2008

(65) Prior Publication Data

US 2009/0310830 A1 Dec. 17, 2009

Related U.S. Application Data

(60) Provisional application No. 61/061,749, filed on Jun. 16, 2008.

(51) Int. Cl.
*G06K 9/00* (2006.01)
*G06F 12/14* (2006.01)

(52) U.S. Cl. ............ 382/124; 382/115; 713/186
(58) Field of Classification Search .......... 382/120, 382/122, 173, 190, 191, 199, 201, 276, 124–127, 382/115, 116, 166; 356/71; 345/173; 713/186
See application file for complete search history.

(56) References Cited

U.S. PATENT DOCUMENTS

| | | | | |
|---|---|---|---|---|
| 5,878,158 | A * | 3/1999 | Ferris et al. | 382/125 |
| 6,836,554 | B1 * | 12/2004 | Bolle et al. | 382/116 |
| 7,120,607 | B2 * | 10/2006 | Bolle et al. | 705/64 |
| 7,333,638 | B2 * | 2/2008 | Chisamore et al. | 382/124 |
| 7,512,257 | B2 * | 3/2009 | Hwang et al. | 382/125 |
| 7,840,034 | B2 * | 11/2010 | Takahashi et al. | 382/116 |
| 7,936,905 | B2 * | 5/2011 | Takahashi et al. | 382/115 |
| 8,005,277 | B2 * | 8/2011 | Tulyakov et al. | 382/125 |
| 2001/0025342 | A1 * | 9/2001 | Uchida | 713/186 |
| 2003/0095714 | A1 * | 5/2003 | Avinash | 382/260 |

OTHER PUBLICATIONS

Jin et al, Secure Minutiae-Based Fingerprint Templates Using Random Triangle Hashing, H. Badioze Zaman et al. (Eds.): IVIC 2009, LNCS 5857, pp. 521-531, 2009.*
Ratha et al, Generating Cancelable Fingerprint Templates, IEEE Transactions on Pattern Analysis and Machine Intelligence, vol. 29, No. 4, Apr. 2007.*
R. Ang, R. Safavi-Naini, and L. McAven, "Cancelable Key-Based Fingerprint Templates," ACISP 2005, LNCS 3574, pp. 242-252, 2005.*

(Continued)

*Primary Examiner* — Andrae S Allison
(74) *Attorney, Agent, or Firm* — Tutunjian & Bitetto, P.C.; Preston J. Young, Esq.

(57) ABSTRACT

A biometric representation of a fingerprint from which the original biometric cannot be recovered (privacy) and which can be canceled and reissued. For example, based on an individual's token, the representation can be scrambled uniquely to the individual. From the scrambled biometric representation it is not feasible to reconstruct the biometric and if the representation is compromised, a new one is easily issued. In another aspect, if a biometric can be represented by some other one-dimensional structure, a distance or similarity measure is defined to compare biometrics. Verification decisions can be made based on the distance between or similarity of biometrics.

20 Claims, 6 Drawing Sheets

OTHER PUBLICATIONS

Farooq, F.; Bolle, R.M.; Tsai-Yang Jea; Ratha, N.;, "Anonymous and Revocable Fingerprint Recognition," Computer Vision and Pattern Recognition, 2007. CVPR '07. IEEE Conference on, vol., no., pp. 1-7, Jun. 17-22, 2007.*

Tuyls et al, Practical Biometric Authentication with Template Protection, AVBPA 2005, LNCS 3546, pp. 436-446, 2005.*

Unttu, L. Lepistö, J. Rauhamaa and A. Visa, Binary histogram in image classification for retrieval purposes, J. WSCG 11 (2003) (1).*

Chulhan Lee, Jaihie Kim, Cancelable fingerprint templates using minutiae-based bit-strings, Journal of Network and Computer Applications, v.33 n.3, p. 236-246, May 2010.*

* cited by examiner

ANONYMOUS AND REVOCABLE FINGERPRINT RECOGNITION

RELATED APPLICATIONS

This application is related to and hereby claims the benefit under 35 U.S.C. §119(e) of U.S. Provisional application No. 61/061,749, filed on Jun. 16, 2008, which provisional application is hereby incorporated by reference in its entirety.

FIELD OF THE INVENTION

The present invention relates generally to biometrics-based authentication.

BACKGROUND

Biometrics-based authentication schemes that use fingerprint matching, face recognition, etc., offer usability advantages over passwords and ID cards. Biometric schemes are therefore rapidly replacing traditional authentication schemes. Despite the obvious advantages, however, the use of biometrics raises several security and privacy concerns. Unlike passwords and cryptographic keys, biometrics are not concealed and can be easily misused without a user's consent. In addition, unlike PINs and credit card numbers, biometrics are permanently associated with an individual and cannot be 'canceled' and changed if compromised. Conceptual frameworks for cancelable biometric representations have been presented in: R. M. Bolle, J. H. Connell, S. Pankanti, N. K. Ratha, and A. W. Senior. *Guide to Biometrics*. Springer Verlag, 2003; and N. K. Ratha, J. H. Connell, and R. Bolle. Enhancing Security and Privacy in Biometrics-based Authentication System. *IBM Systems Journal*, 40(3):614-634, 2001; a comprehensive review can be found in: U. Uludag, S. Pankanti, S. Prabhakar, and A. K. Jain. Biometric Cryptosystems: Issues and Challenges. *Proceedings of the IEEE*, 92(6):948-960, June, 2004.

Recently, anonymous templates for biometric samples have been described. These include adding user-specific 'extra' information to the existing biometric template (reminiscent to password 'salting' methods) [see e.g. T. Connie, A. B. J. Teoh, M. K. O. Goh, and D. C. L. Ngo. PalmHashing: a Novel Approach for Cancelable Biometrics. *Information Processing Letters*, 93(1): 1-5, Jan. 2005; and M. Savvides, B. V. K. V. Kumar, and P. K. Khosla. Cancelable Biometric Filters for Face Recognition. In *International Conference on Pattern Recognition*, pages 922-925, 2004; generating robust keys from noisy biometric data; schemes involving auxiliary information like helper data or fuzzy extractors [see e.g., G. Davida, Y. Frankel, B. Matt, and R. Peralta. On The Relation of Error Correction and Cryptography to an Off-Line Biometric Based Identification Scheme. In *Proceedings of WCC99, Workshop on Coding and Cryptography* (1999); F. Monrose, M. K. Reiter, Q. Li, and S. Wetzel. Cryptographic Key Generation from Voice. In *Proc. IEEE Symp. On Security and Privacy*, pages 202-213, May, 2001; F. Monrose, M. K. Reiter, and S. Wetzel. Password Hardening Based on Key Stroke Dynamics. In *ACM Conf. on Computer and Communications Security*, pages 73-82, 1999; and U. Uludag and A. K. Jain. A Fuzzy Fingerprint Vault. In *Workshop: Biometrics: Challenges arising from theory to practice*, pages 13-16, 2004]; and, non-invertible transforms where the original biometric is transformed using a one-way function [see e.g., R. Ang, R. Safavi-Naini, and L. McAven. Cancelable Key-based Fingerprint Templates. In 10*th Australian Conf. on Information Security and Privacy, ACISP* 2005, pages 242-252, Brisbane, Australia, July, 2005; N. K. Ratha, S. Chikkerur, J. H. Connell, and R. M. Bolle. Generating Cancelable Fingerprint Templates. *IEEE Transactions on Pattern Analysis and Machine Intelligence*, 29(4):561-572, 2007; and S. Tulyakov, F. Farooq, and V. Govindaraju. Symmetric Hash Functions for Fingerprint Minutiae. In *ICAPR* (2), pages 30-38, Bath, UK, 2005].

Unfortunately, the templates often have considerably higher error rates than the baseline matchers [see e.g., S. Tulyakov, F. Farooq, and V. Govindaraju. Symmetric Hash Functions for Fingerprint Minutiae. In *ICAPR* (2), pages 30-38, Bath, UK, 2005; P. Tuyls, A. H. M. Akkermans, T. A. M. Kevenaar, G. J. Schrijen, A. M. Bazen, and R. N. J. Veldhuis. Practical Biometric Authentication with Template Protection. In *AVBPA*, pages 436^146, 2005; and U. Uludag and A. K. Jain. A Fuzzy Fingerprint Vault]. In *Workshop: Biometrics: Challenges Arising from Theory to Practice*, pages 13-16, 2004). A recent work describes one-way transformation functions that work with existing point-based matchers. However, they require that there exist reliable registration points (core and delta in this case) for the alignment of the fingerprints into guarantee repeatability of the transformations [see N. K. Ratha, S. Chikkerur, J. H. Connell, and R. M. Bolle. Generating Cancelable Fingerprint Templates. In *IEEE Transactions on Pattern Analysis and Machine Intelligence*, 29(4):561-572, 2007]. In another work, a two-factor authentication system with high accuracy is presented, but the algorithm also requires a reliable registration point (core) for the extraction of the integrated wavelet and Fourier-Mellin transform. This prevents compatibility of such systems with the existing databases and perhaps fingerprint scanners [see A. Teoh, D. Ngo, and A. Goh. Biohashing: Two Factor Authentication Featuring Fingerprint Data and Tokenised Random Number. *Pattern Recognition*, 37(11):2245-2255, November 2004].

Thus, there is a need for improved anonymous biometrics [see NSF Workshop on Biometrics Research Agenda, April/May, 2003.], which afford the usability advantages of biometrics in combination with the security and privacy advantages of conventional key-based systems. This requires cancelable (also known as revocable) and private biometric representations.

SUMMARY OF THE INVENTION

By way of overview, the present invention describes a method for converting a fingerprint into a binary-string template. In one embodiment, the template can be based on a representation of a fingerprint as a set of triangles derived from sets of three minutiae. Thus, no fingerprint registration points or alignment are required. In another embodiment, fingerprints can also be represented by a set of triangles in a binary space by keeping only the triangles that occur once. The binary representation can then be transformed into an anonymous representation using a unique personal key. The proposed transform is not only computationally infeasible to invert, but in the case that the biometric representation is compromised it can be redefined by simply assigning a different key. Thus, the representation satisfies the above cited needs for biometrics—anonymity and revocability.

In another embodiment, the construction of anonymous, revocable fingerprint representations include of two phases that can be summarized as follows: The first phase is the selection of invariant fingerprint features that are used to compute binary strings from fingerprint images. Second, the non-invertible key-based transforms of these binary strings is performed by issuing a key to each individual, which can be revoked and replaced, resulting in a different binary string.

An example of a fingerprint recognition method in accordance with the present invention includes the steps of: capturing a fingerprint and selecting a plurality of rotation and translation invariant fingerprint features; classifying each fingerprint feature into one of a plurality of discrete categories; computing a unique binary representation vector based on categorized fingerprint features; generating a revocable, non-invertible key-based transformed version of said unique binary representation vector; and storing said key-based transformed version. In one embodiment of a verification phase, a second key-based transformed version is verified against the first key-based transform version.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
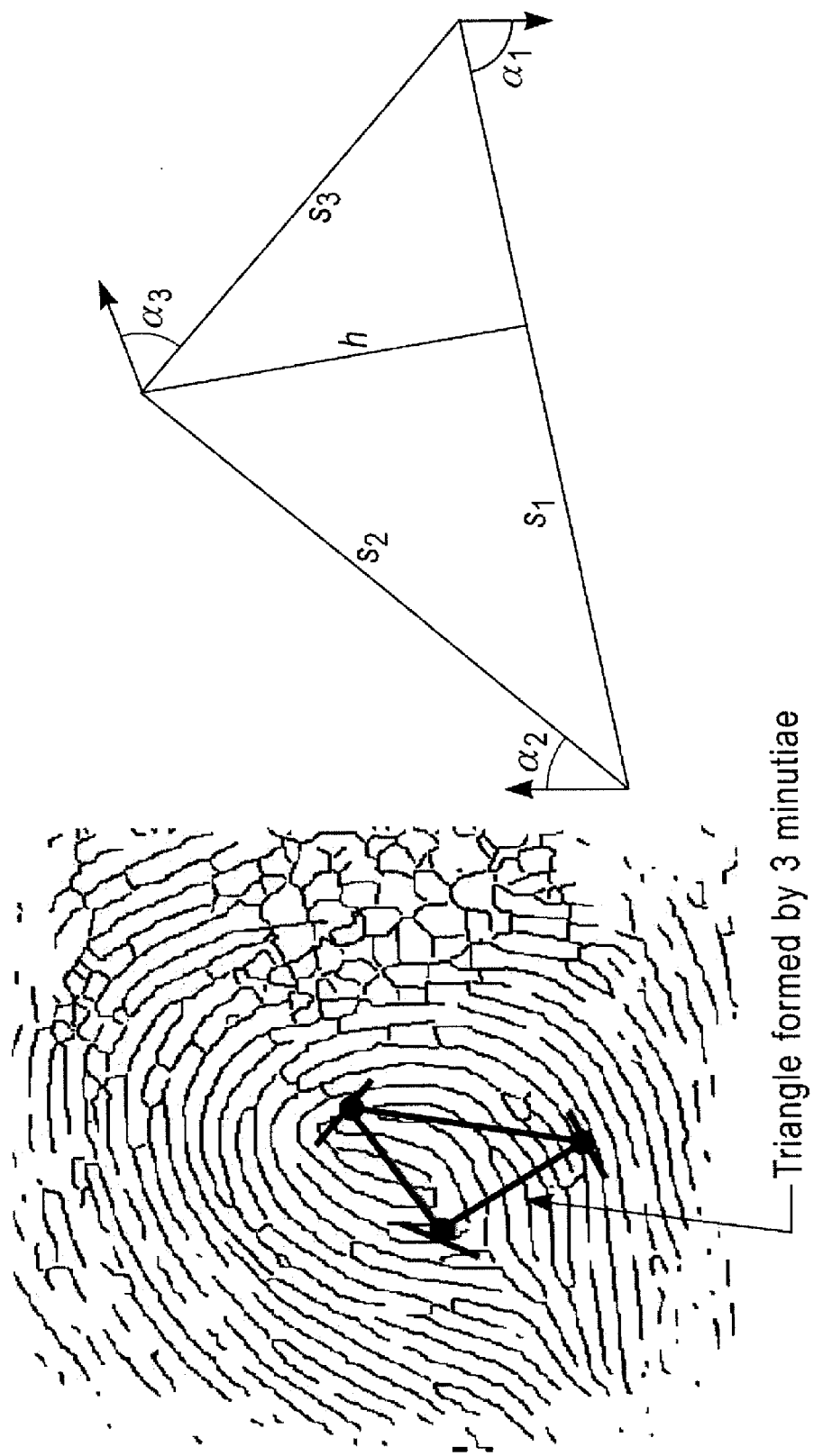
FIG. 1 depicts an example of a representation of a fingerprint as a set of triangles it contains.

By way of overview, the present invention describes a method for converting a fingerprint into a binary-string template. As depicted in FIG. 1, the template can be based on a representation of a fingerprint as a set of triangles derived from sets of three minutiae. Thus, no fingerprint registration points or alignment are required. In another embodiment, depicted in FIG. 6, fingerprints can also be represented by a set of triangles in a binary space by using only the triangles that occur once. As will be described in more detail with reference to FIGS. 5 and 6, the binary representation can then be transformed/mutated into an anonymous representation with the transform details representing a unique personal key which can then be used to randomize an individual's fingerprint binary string. The proposed transform is not only computationally extremely difficult to invert, but in the case that the biometric representation is compromised it can be redefined by simply revoking a compromised key and generating a different key. Thus, the representation satisfies the above cited needs for biometrics—anonymity and revocability.

Figure 2:
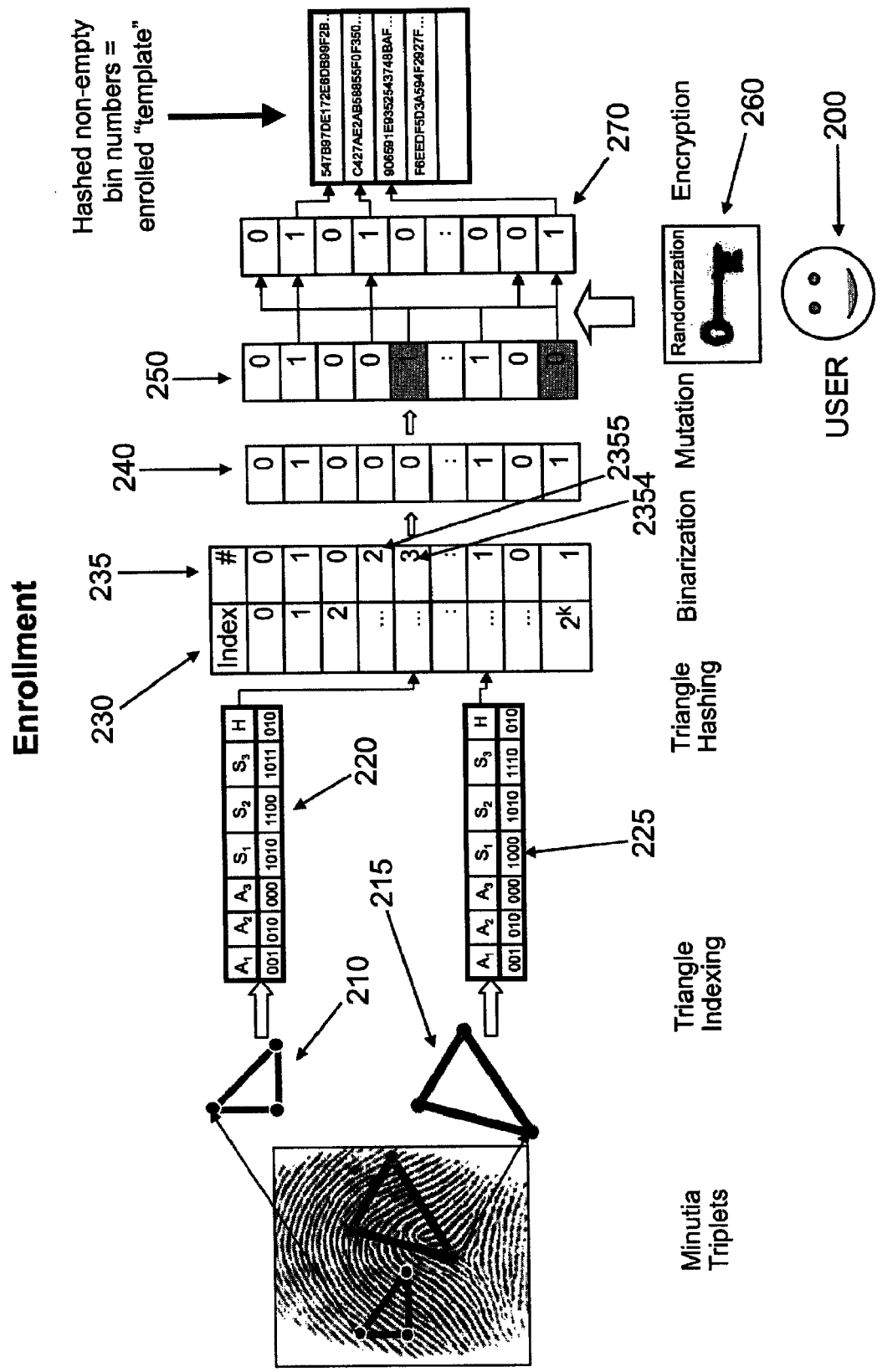
FIG. 2 depicts an overall view of a revocable fingerprint recognition enrollment process in accordance with the present invention.
Figure 3:
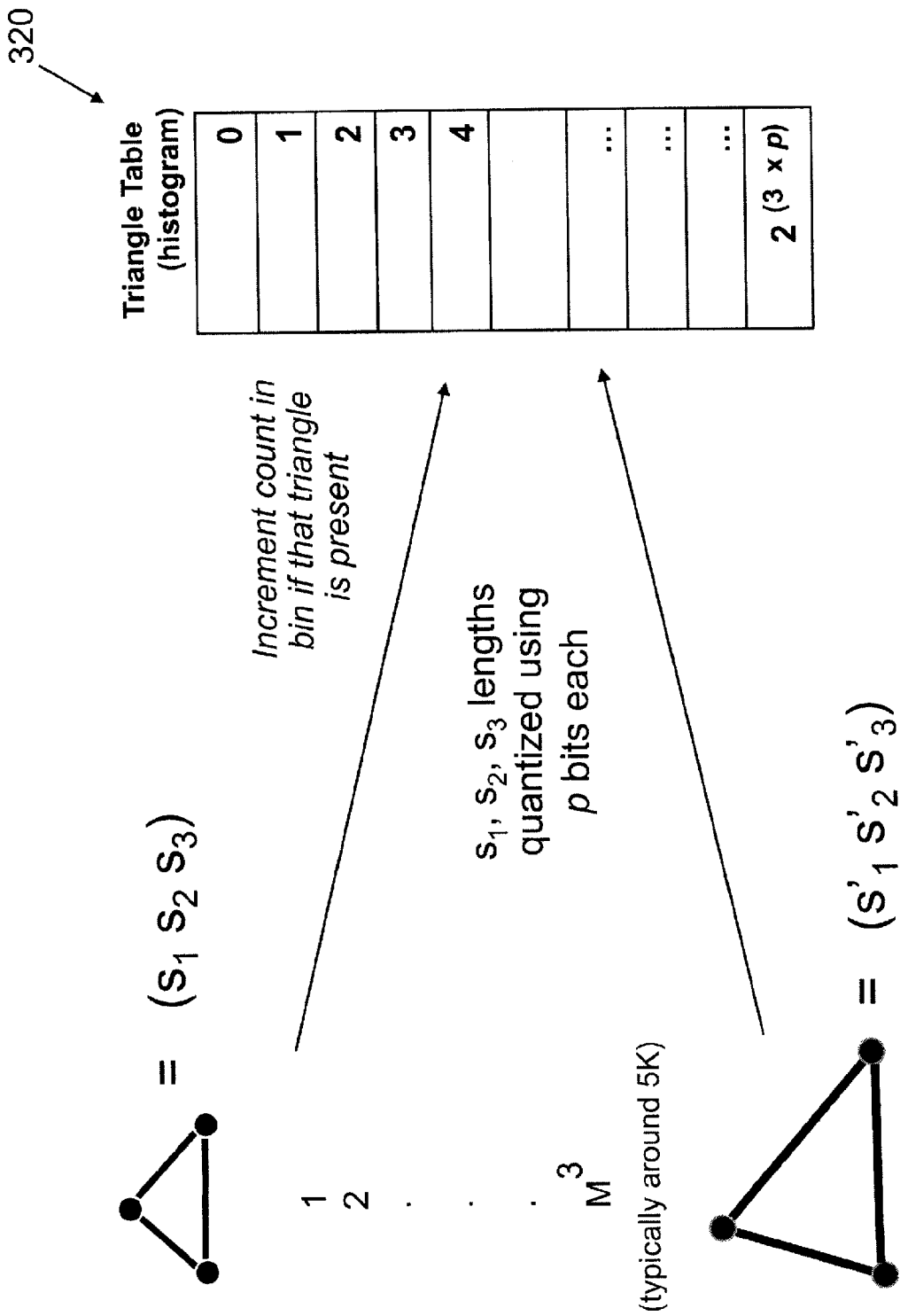
FIG. 3 depicts an example of generating a triangle indexing and hashing process in accordance with one embodiment of the present invention.

Referring now to the example overview depicted in FIG. 2, a process of constructing an anonymous, revocable fingerprint representation can be described as follows:

The first step is the selection of one or more invariant fingerprint features e.g. s1, $s_2$ $s_3$, $a_1$, $a_2$, $a_3$ and h associated with minutia triplets 210, 215, as will be described in more detail with reference to the example depicted in FIG. 1. Next, the selected features can be quantized 220, 225 and assigned a unique index number 230, each occurrence of which is entered into and incremented in a corresponding bin 235 of a histogram, as will be described in more detail with reference to the example depicted in FIG. 3. As will be described in more detail with reference to the example depicted in FIG. 4, commonly occurring triangles (as shown by bins 235, with values >1), do not add significantly to the identification process. Next, the bit vector 240 can be transformed or mutated to another vector 250 by any one of many well know techniques, such as by permutation of bit positions ("scrambling"), and/or random bit flips ("salting"), as will be described in more detail with reference to the example depicted in FIG. 5. The details of the transformation can become a "key" 265 (how to scramble, where to flip a bit, etc.) that is associated with the individual user 200, as will be described in more detail with reference to the example depicted in FIG. 5. The key 265 can be used to randomize 260 an individual user's fingerprint binary string 250 to generate a mutated histogram or string 270, as will be described in more detail with reference to the example depicted in FIG. 6.

Consider the following simple illustration of an enrollment and verification process in accordance with the present invention:

Enrollment:
  Person A gives a biometric string S1
  Person A is given a key ka
  The key is the parameter of a one-way function Hka (S1)=E1
Verification/Authentication:
  Person A gives key ka and biometric S2
  Which is transformed by a one-way function Hka(S2)=E2
  Since S1 and S3 are from the same biometric $D_A$(E2, E1) is small
  Person B gives key ka and biometric S3
  Which is transformed by one-way function Hka(S3)=E3
  Since S1 and S4 are from different biometrics $D_A$(E3, E1) is large For biometric systems the keys are in general, secret, since Hka is a noninvertible function, i.e., a one-way function, with the key as a parameter.

Several techniques for creating anonymous and revocable representations using these binary string representations are described herein below.

Generating Binary Strings from Fingerprints

Referring now to FIG. 1, it is known that triplets of minutiae (ridge ending or bifurcations) form many possible triangles. This triangle geometry is invariant under rigid transformation (translation or rotation) and multiple invariants can be associated with triangles, such as the collection of side lengths. It should also be noted that they are invariant with respect to the position of the triangle within the fingerprint as well as with regard to the overall rotation of the fingerprint.

In one embodiment, the selected fingerprint features include: three sides (s1, s2, s3) of the triangle and the three angles (a1, a2, a3) of the minutiae orientation (as ridge counts vary considerably with image quality). In addition, the height (h) of the largest side from the opposite vertex is used as a $I^{th}$ invariant. These invariant features are not only easy to compute from a standard minutiae representation of a fingerprint, but also prove to be more stable. The invariants are quantized to account for variations caused by distortions during the capture of different prints from the same finger. Fine quantization is sensitive to slight distortions, coarser quantization results in losing the discriminative power of the invariants. Assuming each side is represented by s bits, each angle by a bits and the height by h bits, then every triangle can be represented by and index of $n=3\times(s+a)+h$ bits. An example of the selection of values of step size and the number of bits is described in more detail below. The following algorithm generates a histogram F of such triangles from a fingerprint FP:

$$F_{1...2^n} \leftarrow 0$$
$$\forall \text{ minutia triplets} \in FP$$
$$\quad \text{generate the triangle index } i$$
$$\quad F_i \leftarrow F_i + 1$$
$$\text{End}$$

This results in a histogram F of size $2^{TM}$. This can be further binarized by a simple rule given by:

$$\forall i \in [0, n), F_i = \begin{cases} 0 & \text{if } F_i \neq 1, \\ 1 & \text{otherwise} \end{cases} \quad (1)$$

Figures 4, 5:
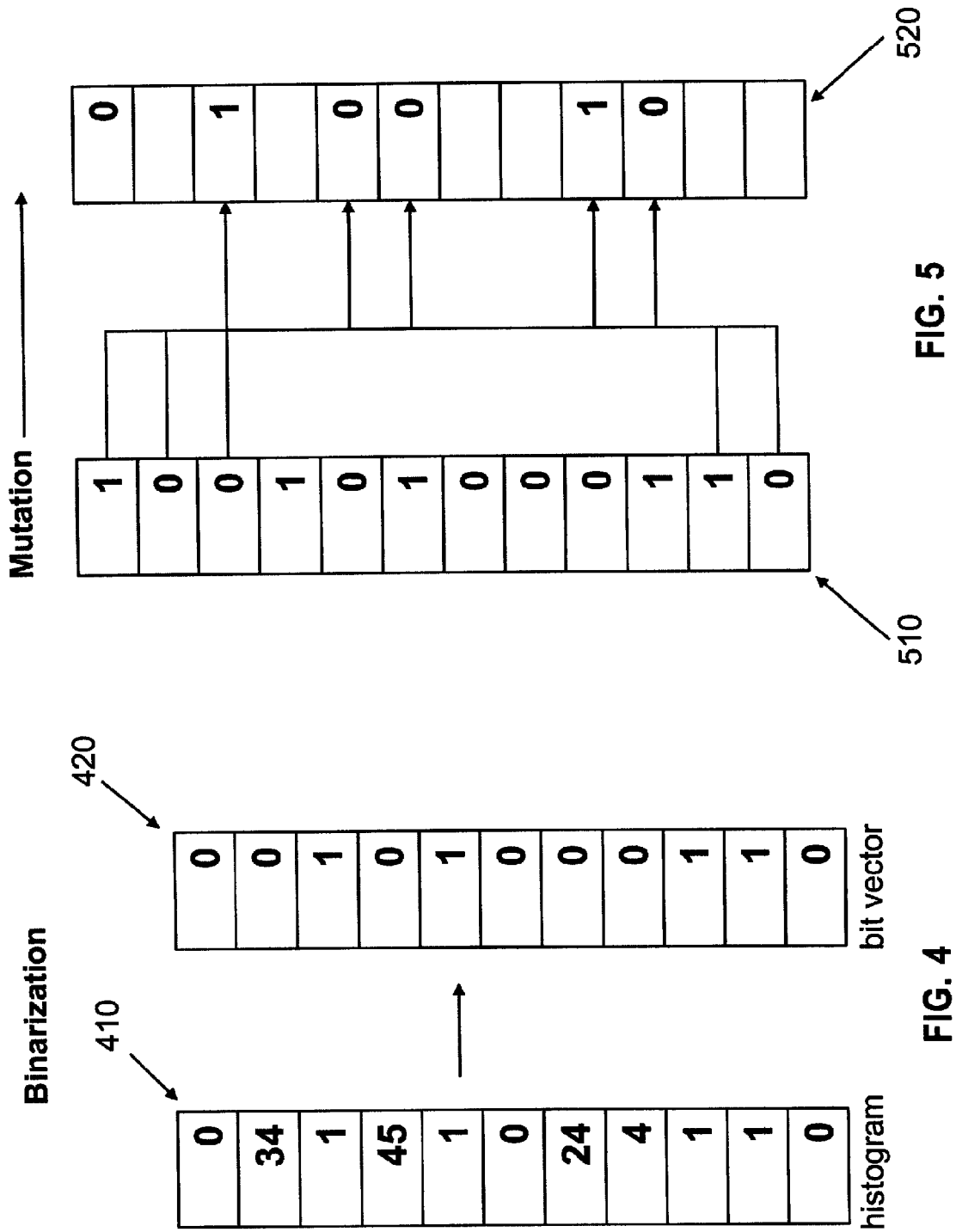
FIG. 4 depicts an example of a binarization of the triangle table histogram of FIG. 3 in accordance with one embodiment of the present invention.
FIG. 5 depicts an example of a mutation (transformation) of the binary bit vector representation of FIG. 4 in accordance with one embodiment of the present invention.

Hence, as depicted in FIG. 4, the binary string in some entry is 1 if the corresponding triangle appears only once in the fingerprint and for every fingerprint in the database we have a binary vector. Those skilled in the art will appreciate that the classification results are the same whether using a histogram intersection or a bit vector intersection.

Transformation of Binary Vectors

Once the binary vectors are acquired from the fingerprints we perform operations on the vectors similar to standard genetic algorithm operations.

Mutation

As is depicted in the example shown in FIG. 5, each fingerprint of the binary vector 510 can be mutated randomly to generate a mutated binary vector 520. In one embodiment, this can be achieved by setting each 0 bit to 1 and vice-versa depending on a random probability $P_{rand}$ and an empirically established threshold $P_{uut}$. For each of the $2^{24}$ positions in the vector, generate the random probability $P_{rand}$. If $P_{rand} < P_{MUU}$, then toggle the bit at that position. This operation adds noise to the fingerprint vector and hardens against a brute-force attack on the inversion. No longer can just 0s and 1s be tried, the probabilities $P_{rand}$ and $P_{uut}$ also have to be incorporated in the attack.

Randomization

Figure 6:
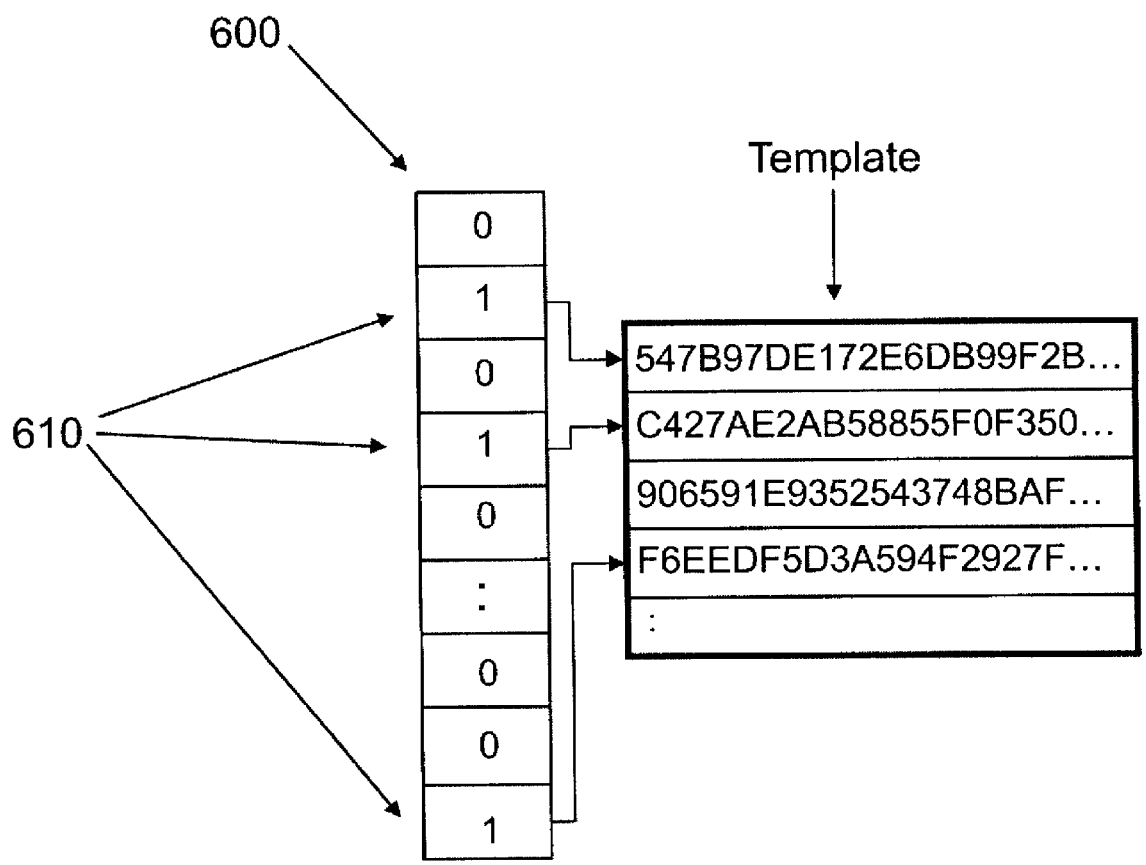
FIG. 6 depicts an example of a randomization of the binary bit vector in accordance with the present invention.

Referring now to FIG. 6, each individual in the database is assigned a unique key, which represents the transformation details described with reference to FIG. 5. This key can be used to randomly permute (randomize) an individual's mutated fingerprint binary string 520, resulting in a mutated histogram or string 600. As will be described in more detail below with reference to the verification process, during verification, the user presents his key and his fingerprint and the permutation operations on the binary string are performed in the same order. This guarantees that the fingerprint presented for verification is randomly permuted in the same manner as the one enrolled. This random permuting makes the brute force attack to invert the binary string to the original string intractable. After randomization of the binary strings (both enrolled and test fingerprint), the matching score can be calculated by comparing the two strings.

Encrypting the Binary String

Figure 7:
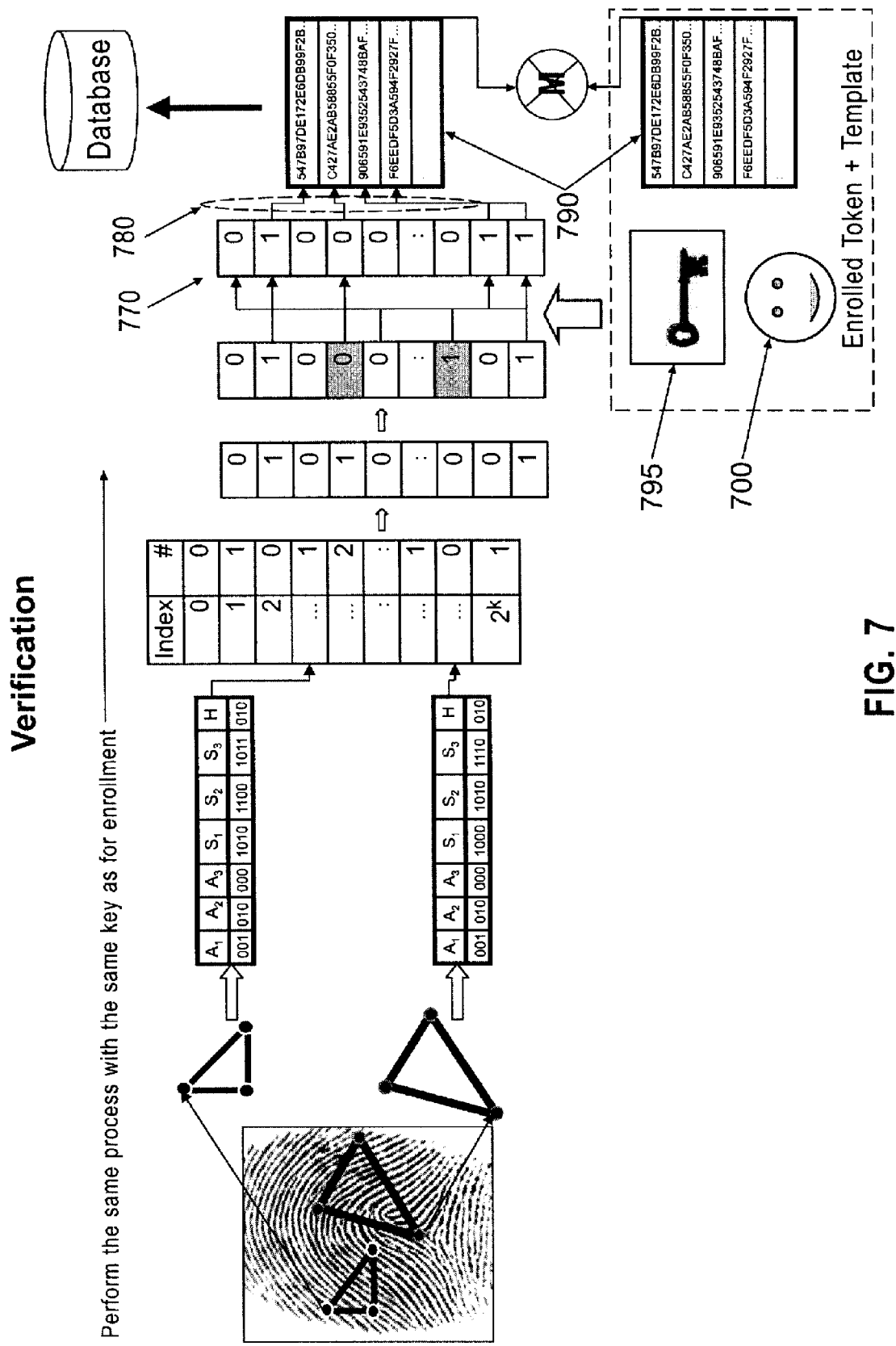
FIG. 7 depicts an example of a verification process in accordance with the present invention.

Referring now to FIG. 7, according to another aspect of the invention, to acquire a compact and secure representation of the template generated above, one can store only the addresses of the locations where the bit is set to 1, i.e., the non-empty bins in string 770. Since bin numbers must match exactly, one could also encrypt or hash 780 the bin numbers to prevent reconstruction of the original bit vector from the list to create the enrolled template 790. The hash or encryption function and its parameters form an additional part of the "key". Those skilled in the art will appreciate that any hashing technique like MD5 or SHA-1 or key-based encryption technique, such as RSA, can be used. In one implementation the values are hashed using the standard MD5 algorithm that uses a 128-bit hash value and the error rates remained unchanged due to a low average collision rate of $2^{-50}$ in MD5. The choice of MD5 was solely based on the compactness of the hashed output. During verification, the hashed values can be compared and the scores calculated.

Cancelability

In the case of a lost card or a database breach where the key 795 or a transformed template 790 is compromised, the present invention has features that allow the cancellation of the template (scrambled binary string) and key and the assignment to the individual 700 of a new key and hence template. If we assume that in case the template 790 or key 795 is lost, the original fingerprint cannot be reconstructed from the scrambled template. Then the security of the system can be restored by assigning a new key and thus a new transformed template to the user.

Verification

Referring still to the example depicted in FIG. 7, each individual 700 can be assigned a unique key 795 (or token) that can be stored in a database. This key was used to enroll that individual's fingerprint representation as described hereinabove, resulting in a mutated histogram or string. During verification, the individual presents his fingerprint for reading and his key; and the same operations as was done during enrollment (FIG. 2) are repeated in the same order. This ensures that the fingerprint presented for verification is randomly permuted in the same manner as the one enrolled. The individual's stored template is then retrieved from the database and the two are compared.

Distance Metric

The matching score between two binary histograms of two fingerprints acquired after the transformation can be calculated by finding the intersection between the two binary strings. This is achieved by simply counting the positions in the binary strings that have a value 1 in both strings. However, this has the drawback that it depends on the magnitude of the strings, with the magnitude defined by the total number of ones in the string. In the extreme, a fingerprint is richly represented by triangles with many 1s in the binary string (vector) and high magnitude. On the other hand, other fingerprints are represented only by few triangles and consequently the magnitude of those vectors is small. To account for the differences in the magnitudes, the score may be normalized by dividing it by the geometric mean of the two magnitudes. Thus, if F and F are the enrolled and the test fingerprint vectors (strings) of size $n=2^{24}$, then the matching score between F and F is calculated as:

$$S(F, \bar{F}) = \frac{\sum_{i=1}^{n} \min(F_i, \bar{F}_i)}{\sqrt{\sum_{i=1}^{n} F_i \sum_{i=1}^{n} \bar{F}_i}}. \qquad (2)$$

There is a relationship between the dot product of two vectors (strings) and the scoring formula in Equation (2) above. This resemblance leads to a useful property of the inventive representation. Since, the dot product remains unchanged under orthonormal transformations, the representation of the fingerprint can be used in a biohashing technique such as is described in Teoh et al. [15] without requiring a registration point. Thus, in addition to the embodiment employing transformation techniques described here, existing bio-hashing technique can also be utilized to secure the templates without a loss in accuracy.

Thus, the present invention represents a significant advancement in the field of biometric identification. While the foregoing is directed to the preferred embodiment of the present invention, other and further embodiments of the invention may be devised without departing from the basic scope thereof, which is determined by the claims that follow.

We claim:

1. A fingerprint recognition method, comprising the steps of:
    capturing a fingerprint and selecting a plurality of rotation and translation invariant fingerprint features;
    classifying each fingerprint feature into one of a plurality of discrete categories;
    computing a unique binary representation vector based on categorized fingerprint features that occur only once in the fingerprint;
    generating a revocable, non-invertible key-based transformed version of said unique binary representation vector; and
    storing said key-based transformed version.

2. The method of claim 1, further comprising verifying a second key-based transformed version against said key-based transform version.

3. The method of claim 1, wherein said rotation and translation invariant fingerprint features comprise measurements associated with triangles formed by a selected set of three fingerprint minutia points.

4. The method of claim 3, where the invariant fingerprint features include a ridge count along one or more edges of the triangles.

5. The method of claim 3, where the invariant fingerprint feature includes the angles at one or more vertices of the triangles.

6. The method of claim 3, further comprising computing an index to represent the triangle.

7. The method of claim 6, wherein the vector comprises one of a histogram and a binary vector.

8. The method of claim 1, wherein said step of computing a unique binary representation vector based on categorized fingerprint features further comprises the steps of:
    generating a histogram of how many features fall into each of the categories; and
    computing a unique binary representation vector based on the generated histogram.

9. The method of claim 8, wherein said computing a unique binary representation vector based on the generated histogram comprises listing indices of all histogram bins that have exactly one fingerprint feature in them.

10. The method of claim 1, further comprising quantizing the fingerprint features to remove distortions caused during multiple captures of selected fingerprint features.

11. The method of claim 1, wherein said generating step comprises the at least one steps of adding bits, dropping bits and scrambling positions of bits in the feature vector based on a key.

12. The method of claim 1, wherein positions of '1's in the vector are hashed using a key and the hashed values are stored in another vector.

13. A fingerprint recognition system, comprising:
    means for capturing a fingerprint and generating a plurality of rotation and translation invariant fingerprint features, wherein said rotation and translation invariant fingerprint features are measurements associated with triangles formed by a selected set of three fingerprint minutia points;
    means for classifying each fingerprint feature into one of a plurality of discrete categories;
    means for computing a unique binary representation vector based on categorized fingerprint features that occur only once in the fingerprint;
    means for generating a revocable, non-invertible key-based transformed version of said unique binary representation vector; and
    means for storing said key-based transformed version.

14. The fingerprint recognition system of claim 13, further comprising means for verifying a second key-based transformed version against said key-based transform version.

15. The fingerprint recognition system of claim 13, wherein said means for computing a unique binary representation vector based on categorized fingerprint features further comprises:
    means for generating a histogram of how many features fall into each of the categories; and
    means for computing a unique binary representation vector based on the generated histogram, wherein a generated histogram comprises a listing of indices of histogram bins that have exactly one feature in them.

16. A computer program product comprising a non-transitory computer readable storage medium having computer useable program code for managing a computer network, said computer program product including computer useable program code to perforin the steps of:
    capturing a fingerprint and selecting a plurality of rotation and translation invariant fingerprint features;
    classifying each fingerprint feature into one of a plurality of discrete categories;
    computing a unique binary representation vector based on categorized fingerprint features that occur only once in the fingerprint;
    generating a revocable, non-invertible key-based transformed version of said unique binary representation vector; and
    storing said key-based transformed version.

17. The computer program product of claim 16, further comprising verifying of a second key-based transformed version against said key-based transform version.

18. The computer program product of claim 16, wherein said rotation and translation invariant fingerprint features are measurements associated with triangles formed by a selected set of three fingerprint minutia points.

19. The computer program product of claim 16, wherein said step of computing a unique binary representation vector based on categorized fingerprint features further comprises the steps of:
  generating a histogram of how many features fall into each of the categories; and
  computing a unique binary representation vector based on the generated histogram.

20. The computer program product of claim 16, wherein said computing a unique binary representation vector based on the generated histogram comprises listing indices of all histogram bins that have exactly one fingerprint feature in them.

\* \* \* \* \*